(12) United States Patent
Dale et al.

(10) Patent No.: US 11,797,323 B2
(45) Date of Patent: Oct. 24, 2023

(54) VIRTUAL MACHINE FOR VIRTUALIZING GRAPHICS FUNCTIONS

(71) Applicant: THE BOEING COMPANY, Chicago, IL (US)

(72) Inventors: Timothy James Dale, St. Louis, MO (US); Jonathan Nicholas Hotra, Maryland Heights, MO (US); Glenn Alan Patterson, St. Louis, MO (US); Craig H. Sowadski, House Springs, MO (US)

(73) Assignee: The Boeing Company, Arlington, VA (US)

( * ) Notice: Subject to any disclaimer, the term of this patent is extended or adjusted under 35 U.S.C. 154(b) by 240 days.

(21) Appl. No.: 17/399,675

(22) Filed: Aug. 11, 2021

(65) Prior Publication Data

US 2022/0083362 A1  Mar. 17, 2022

Related U.S. Application Data

(60) Provisional application No. 62/706,878, filed on Sep. 15, 2020.

(51) Int. Cl.
*G06F 9/44* (2018.01)
*G06F 9/455* (2018.01)
(Continued)

(52) U.S. Cl.
CPC .......... *G06F 9/45512* (2013.01); *G06F 9/226* (2013.01); *G06F 9/3879* (2013.01); *G06F 9/45558* (2013.01); *G06F 2009/45583* (2013.01)

(58) Field of Classification Search
CPC .................................... G06F 9/45512
(Continued)

(56) References Cited

U.S. PATENT DOCUMENTS 10,417,023 B2 * 9/2019 Shi ........................ G06F 9/455
2006/0146057 A1 * 7/2006 Blythe ................ G06F 9/45533
345/506

(Continued)

FOREIGN PATENT DOCUMENTS

CN    103424115 B    12/2015
CN    106371890 A    2/2017
(Continued)

OTHER PUBLICATIONS

Height, "What Is a Virtual GPU?", The NVIDIA Blog, Jun. 11, 2018, https://blogs.nvidia.com/blog/2018/06/11/what-is-a-virtual-gpu/.

(Continued)

*Primary Examiner* — Timothy A Mudrick
(74) *Attorney, Agent, or Firm* — Armstrong Teasdale LLP

(57) ABSTRACT

A host computer for emulating a target system includes a host memory, a CPU, and a host GPU. The host memory is configured to store a library of graphics functions and a VM. The VM includes a section of emulated memory storing target code configured to execute on the target system. The CPU is configured to execute the VM to emulate the target system. The VM is configured to execute the target code and intercept a graphics function call in the target code. The VM is further configured to redirect the graphics function call to a corresponding graphics function in the library of graphics functions stored in the host memory. The host GPU is configured to execute the corresponding graphics function to determine at least one feature configured to be rendered on a display coupled to the host GPU.

26 Claims, 5 Drawing Sheets

(51) Int. Cl.
  *G06F 9/22* (2006.01)
  *G06F 9/38* (2018.01)
(58) Field of Classification Search
  USPC .......................................................... 719/320
  See application file for complete search history.

(56) References Cited

U.S. PATENT DOCUMENTS

| 2017/0132744 A1 | 5/2017 | Wilt et al. |
| 2019/0347137 A1* | 11/2019 | Sivaraman ............ G06F 9/5044 |

FOREIGN PATENT DOCUMENTS

| CN | 108107456 A | 6/2018 |
| CN | 108693510 A | 10/2018 |
| CN | 109697102 A | 4/2019 |
| CN | 106406977 B | 6/2019 |
| CN | 110503318 A | 11/2019 |
| CN | 110515050 A | 11/2019 |

OTHER PUBLICATIONS

Knuth, "NVIDIA, AMD, and Intel: How they do their GPU Virtualization", BrianMadden, Sep. 26, 2016, https://www.brianmadden.com/opinion/NVIDIA-AMD-and-Intel-How-they-do-their-GPU-virtualization.

Garg et al., "Empirical Analysis of Hardware Assisted GPU Virtualization", 2019 IEEE 26th international Conference on High Performance Computing, Data, and Analytics (HiPC), Dec. 17-19, 2019, pp. 395-405.

Shi et al., "vCUDA GPU Accelerated High-Performance Computing in Virtual Machines", IEEE Transactions on Computers, vol. 61, No. 6, Jun. 2012, pp. 804-816.

Gu, Jing et al., GaiaGPU: Sharing GPUs in Container Clouds, 2018 IEEE Intl Conf on Parallel & Distributed Processing with Applications, Ubiquitous Computing & Communications, Big Data & Cloud Computing, Social Computing & Network, Sustainable Computing & Communicatoins, IEEE Computer Society, Dec. 11, 2018, pp. 469-476.

* cited by examiner

VIRTUAL MACHINE FOR VIRTUALIZING GRAPHICS FUNCTIONS

CROSS-REFERENCE TO RELATED APPLICATIONS

This application claims priority to U.S. Provisional Patent Application No. 62/706,878 filed on Sep. 15, 2020 titled "Virtual Machine for Virtualizing Graphics Functions," the entire contents of which are hereby incorporated herein by reference.

FIELD

The field of the disclosure relates generally to simulation of embedded systems and, more specifically, to the application of virtualization to graphics functions.

BACKGROUND

Certain aspects of system simulation aim to use, test, or otherwise exercise the software for a given target system without the genuine hardware itself. This simulation can be achieved by modifying, or "re-targeting," the software (i.e., the target code) to compile on the native hardware and operating system (OS) of a host computer, or "host." The re-targeted code includes an application programming interface (API) to bridge between the re-targeted code and the native hardware and OS. Generally, re-targeting the software is labor-intensive and reduces the fidelity of the simulation.

Alternatively, the simulation can be achieved by virtualizing the embedded system, or "target hardware" (e.g., on a virtual machine, or VM) to execute one or more portions of the target code, where the VM executes via a hypervisor on the host computer, or host. In some instances, VMs execute without a hypervisor. Virtualization refers to the imitation of a given unit of hardware by a software program, such as a VM, executing on a local, or host, computer. Virtualizing target hardware, such as, for example, a single board computer (SBC) or a data bus controller, generally requires detailed knowledge of the specific target hardware to build a VM that will imitate, or emulate, the target system with comparable performance to the genuine hardware. For the purpose of this disclosure, the terms "virtualization" and "emulation" are used interchangeably to refer to a VM where any aspect of target hardware is being emulated, although the host computer may use one or more other aspect of target hardware.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is directed to a host computer for emulating a target system. The host computer includes a host memory, a central processing unit (CPU), and a host GPU. The host memory is configured to store a library of graphics functions and a virtual machine (VM). The VM includes a section of emulated memory storing target code configured to execute on the target system. The CPU is configured to execute the VM to emulate the target system. The VM is configured to execute the target code and intercept a graphics function call in the target code. The VM is further configured to redirect the graphics function call to a corresponding graphics function in the library of graphics functions stored in the host memory. The host GPU is configured to execute the corresponding graphics function to determine at least one feature configured to be rendered on a display coupled to the host GPU.

Another aspect is directed to a method of executing graphics function calls in a VM emulating a target system. The method includes executing the VM on a host computer including a host GPU. The method includes executing target code for the target system within the VM, the target code including a first graphics function call to a first graphics function allocated a first address in emulated memory of the VM. The method includes mapping the first address to a first graphics intercept function including a call to at least one corresponding graphics function in a library of graphics functions stored in host memory of the host computer and targeted to the host GPU. The method includes intercepting the first graphics function call at the first address in emulated memory of the VM. The method includes executing, based on the mapping, the at least one corresponding graphics function to determine at least one feature configured to be rendered on a display coupled to the host GPU.

Yet another aspect is directed to a computer-readable memory coupled to a CPU, a host GPU, and RAM of a host computer. The computer-readable memory includes a target code section storing target code configured to be executed by a target system. The computer readable memory includes a library of graphics functions targeted to the host GPU. The computer readable memory includes a VM section storing a VM that, upon execution by the CPU, allocates a plurality of address spaces in the RAM corresponding to graphics functions invoked by the target code. The VM section includes a plurality of graphics intercept functions including calls to at least one corresponding graphics function in the library of graphics functions targeted to the host GPU. The VM section includes a mapping of the graphics functions invoked by the target code to the plurality of graphics intercept functions. The execution of the target code by the VM results in intercepting invocations of graphics functions in the target code and redirecting the invocations to at least one corresponding graphics function targeted to the host GPU to determine at least one feature configured to be rendered on a display coupled to the host GPU.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Figure 1:
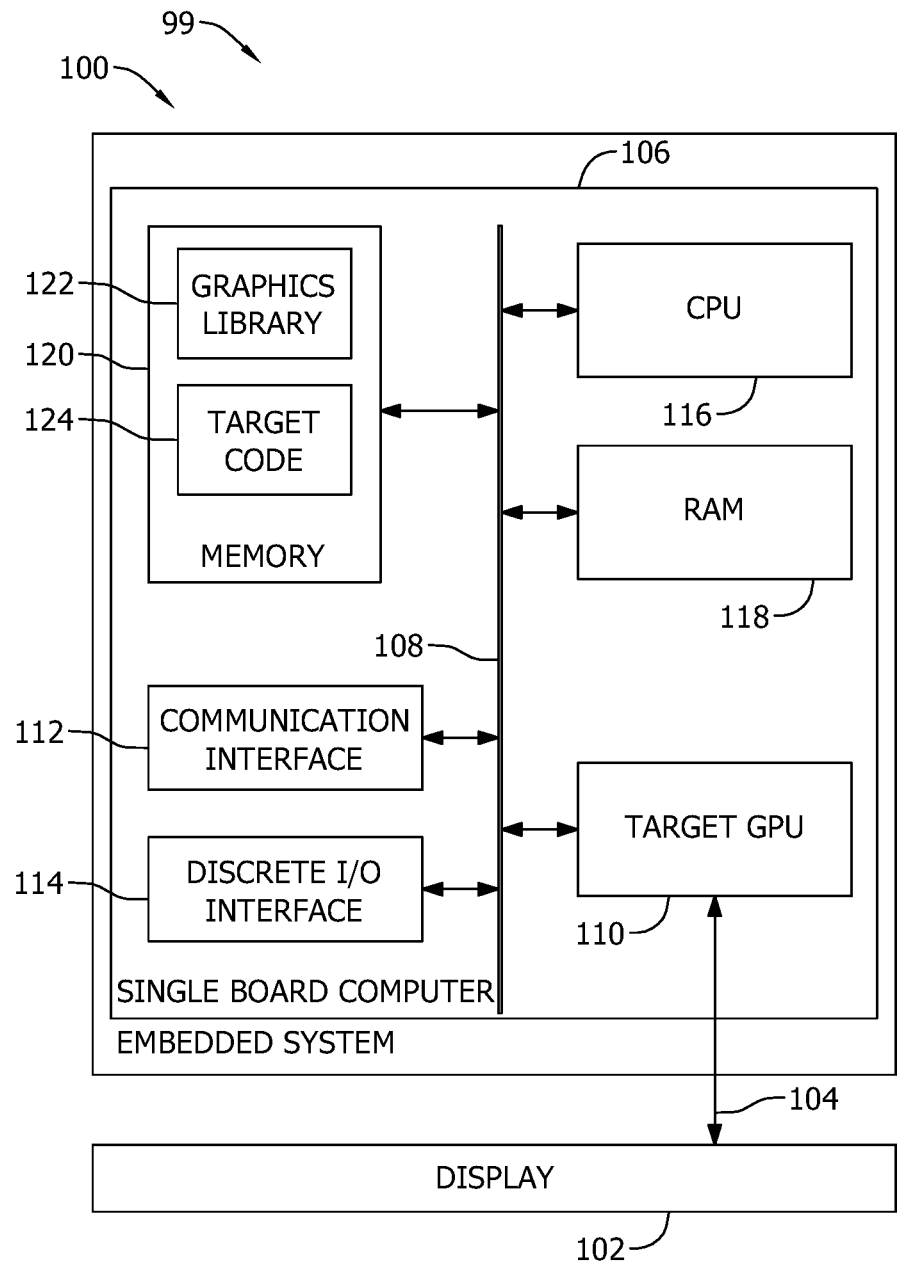
FIG. 1 is a block diagram of an example embedded system in accordance with an embodiment.

Corresponding reference characters indicate corresponding parts throughout the several views of the drawings. Although specific features of various examples may be shown in some drawings and not in others, this is for convenience only. Any feature of any drawing may be referenced and/or claimed in combination with any feature of any other drawing.

DETAILED DESCRIPTION

Traditionally, where details of specific target hardware are scarce, where operation is complex, or where processing demands are high, virtualization of at least some target systems, or hardware, such as a graphics processing unit (GPU), may be impractical without sacrificing fidelity. For example, documentation of hardware registers within a GPU is generally scarce, so virtualizing the GPU would generally require reverse engineering, although reverse engineering may not even be possible for the GPU. Further, the emulation of graphics data handling would have to be handled at a register level, or the target GPU registers would have to be mapped to host GPU registers, which may not match one-to-one and calls to the target GPU registers may not be compatible with calls to host GPU registers. Moreover, a virtualized GPU could operate relatively slow resulting in reduced overall performance of the VM. Moreover, traditional approaches emulating the GPU are often computationally expensive and taxing for the VM.

Examples described herein take these traditional issues and other factors into account. A technical effect of examples herein improves computing performance by reducing the burden on the VM. A technical effect of examples herein improves the operation of a computer by reducing the burden on the CPU via the VM.

The host computer and virtual machine (VM) disclosed provide high-fidelity virtualization of graphics functions of a target system without virtualizing the GPU of the target system. GPUs, i.e., the target GPUs, in some embedded systems, such as avionics devices or other land or marine vehicle computing systems, or healthcare computing systems and medical devices, particularly those with display functions such as, for example, a controller for a multi-function display (MFD), are complex, perform high-bandwidth computations, and often incorporate proprietary technology that make virtualization impractical. The host computer disclosed herein hosts a VM that virtualizes, or emulates, certain hardware of the target system, executes the target code, and intercepts graphics function calls (e.g., OpenGL, DirectX, or Metal calls, or calls for any other graphics library, interface, or standard originally directed to the target GPU of the target system) before run-time, at the initiation, or start-up, of the target code, or at run-time to redirect them for execution by the host GPU for the host computer. In an alternative embodiment, the host computer may host a VM that virtualizes another computing system having a different OS and/or graphics library, executes the target code, and intercepts graphics function calls to redirect them for execution by the host GPU for the host computer. Intercept is accomplished by identifying, in the VM, addresses of graphics functions invoked in the target code (e.g., binary or assembly code), and registering, or mapping, each to a graphics intercept function, in the VM, targeted to the host GPU. Accordingly, the VM redirects each graphics functional call to the host GPU without modifying the target code and without compromising the fidelity of the simulation and graphics output.

Generally, in the disclosed embodiments, the host GPU of the host computer is different from the target GPU of the target system, but the host implementation of the graphics library is sufficiently compatible that fidelity of the simulation and graphics output are not significantly impacted.

FIG. 1 is a block diagram of an example target system 99. In the illustrated example, the target system 99 is an embedded system 100. Embedded system 100 operates a display 102 primarily over a graphics interface 104. Embedded system 100 includes one or more single board computer (SBC) 106, each including one or more peripheral hardware connected to SBC 106 over a data bus 108. The peripheral devices include, for example, a target GPU 110, a communication interface 112, and a discrete input/output (I/O) interface 114. Embedded system 100 may also include, for example, persistent and non-persistent memory, sensors, bus controllers, or interrupt controllers (not shown). In other embodiments, other configurations are contemplated, such as a multi-board computer.

SBC 106 is a computing system embodied on a single printed circuit board and is often used in compact embedded systems, such as avionics, or computing systems in ships, heavy equipment, or land vehicles, such as automobiles, armored vehicles, or tanks, or in high density computing systems, such as servers or other "blade" computing systems. SBC 106 generally includes a central processing unit (CPU) 116, random access memory (RAM) 118, and memory 120. In alternative embodiments, certain aspects of SBC 106 may be "off-board." For example, CPU 116, RAM 118, and memory 120 may be integrated onto SBC 106, while target GPU 110, communication interface 112, and discrete I/O interface 114 may be implemented separately on one or more different circuit boards, daughter boards, or mezzanine cards.

Memory 120 includes multiple sections, including at least a graphics library 122 and a section storing target code 124. In operation, SBC 106 and, more specifically, CPU 116 gains access to memory 120 to retrieve and execute target code 124. Target code 124 includes, for example, executable binary code for operating display 102. Accordingly, target code 124 includes graphics function calls to various graphics functions in graphics library 122. When such a call is executed by CPU 116, CPU 116 directs the call to target GPU 110 to carry out execution of the graphics function, which ultimately results in determining one or more features that can be, or are configured to be, rendered on display 102.

Additionally, target code 124 includes instructions for CPU 116 to interact with one or more peripheral hardware, such as communication interface 112 and discrete I/O interface 114.

Figure 2:
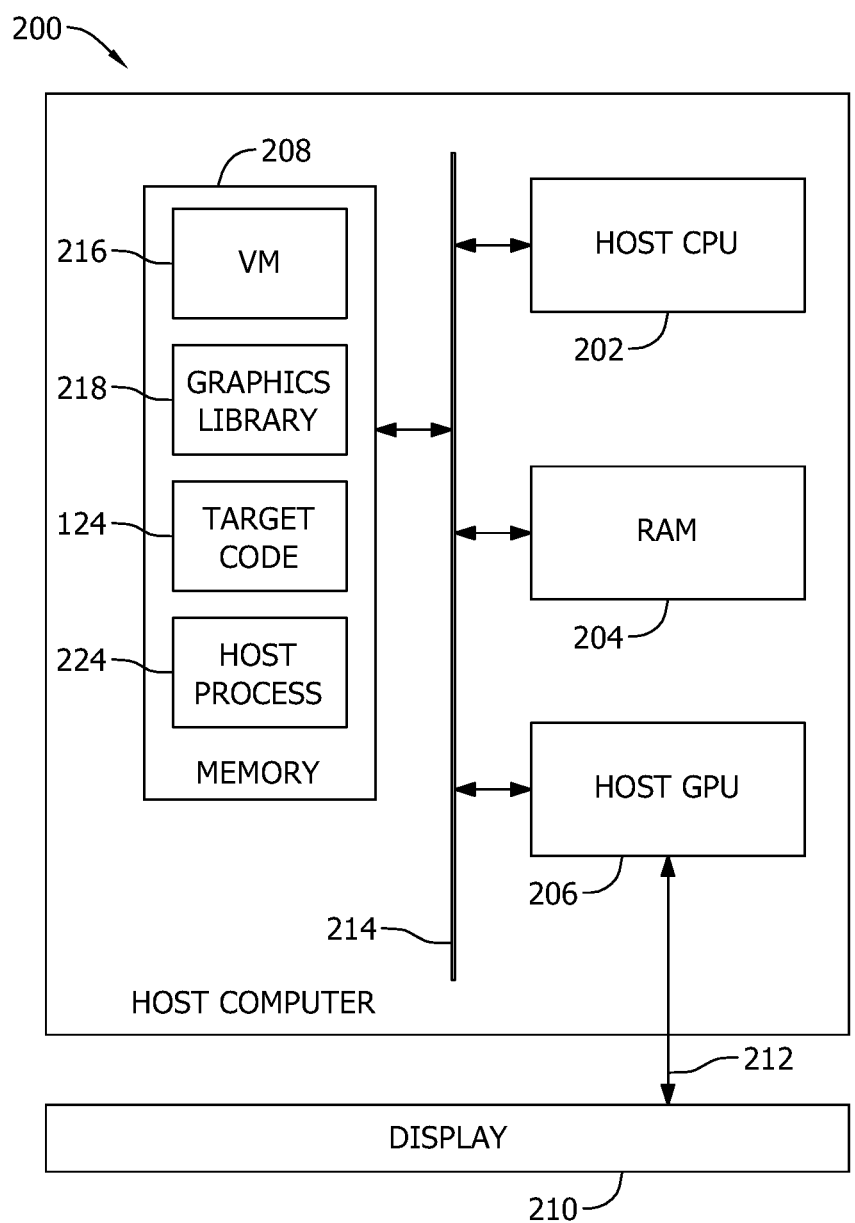
FIG. 2 is a block diagram of an example host computer for emulating the embedded system shown in FIG. 1 in accordance with an embodiment.

FIG. 2 is a block diagram of an example host computer 200 for emulating embedded system 100 shown in FIG. 1. Host computer 200 includes a host CPU 202, RAM 204, a host GPU 206, and computer-readable host memory 208. Host computer 200 operates a display 210 primarily over a graphics interface 212 extending between host GPU 206 and display 210. Display 210 may be a generic display device, such as an LCD or LED display, a wearable display such as virtual or augmented reality glasses, goggles, or visor, or in the alternative, may be a genuine display, such as display 102. Host CPU 202, RAM 204, host GPU 206, and host memory 208 are connected within host computer 200 by a data bus 214.

Host memory 208 includes a section storing a VM 216, a section storing a graphics library 218 of various graphics functions directed to host GPU 206, a section storing target code 124 from embedded system 100, and a section storing a host process 224, or a host program, that orchestrates emulation of the various hardware components of embedded system 100. Host process 224 may include, for example, an application stored in host memory 208 and loaded into RAM 204 for execution by host CPU 202. Graphics library 218 may include, for example, OpenGL, DirectX, or Metal functions, or any other graphics library having an implementation that can execute on the host computer, e.g., host computer 200. In certain embodiments, host memory 208 may include a section storing at least a portion of target graphics library 122 directed to host GPU 206. In alternative embodiments, one or more section of host memory 208 may be omitted and the data stored remotely. For example, in certain embodiments, target code 124 may be stored remotely on a server or mass-storage device, and made available over a network to host CPU 202.

Figure 3:
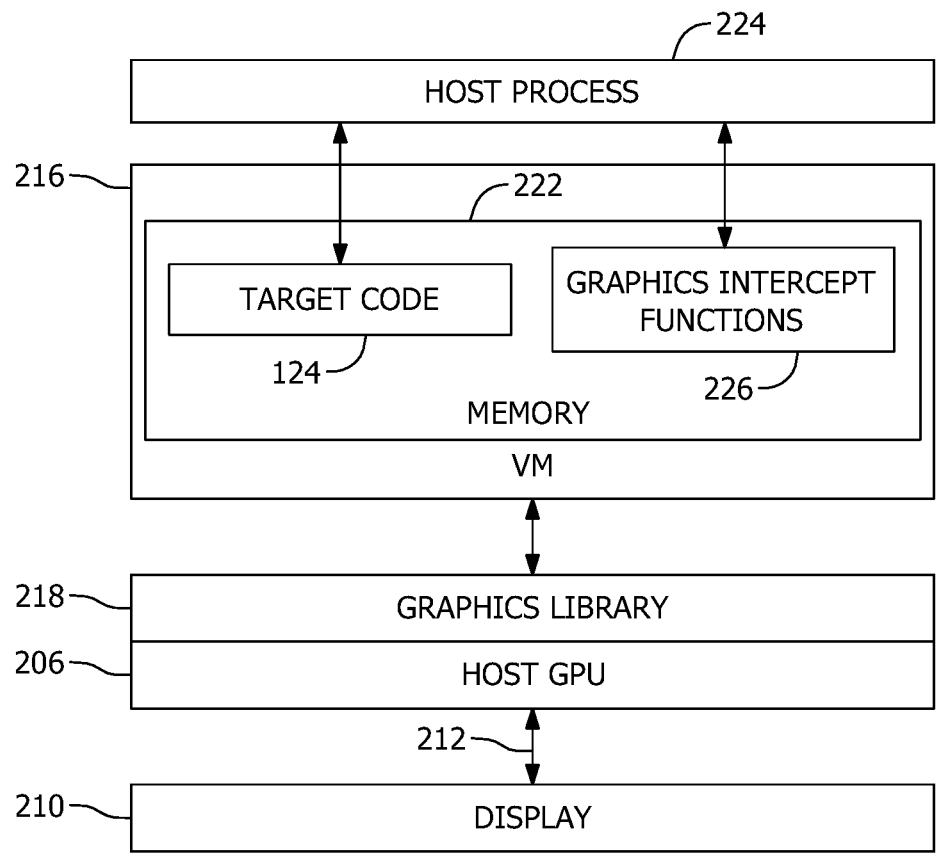
FIG. 3 is a block diagram of an example virtual machine for emulating the embedded system shown in FIG. 1 in accordance with an embodiment.

FIG. 3 is a block diagram of VM 216 for emulating embedded system 100 shown in FIG. 1. Host CPU 202 gains access to host memory 208 and executes VM 216. VM 216 includes an emulated memory 222 that stores, for example, target code 124. Host process 224, executing on host CPU 202, orchestrates execution of VM 216 and target code 124. For example, host process 224 orchestrates, or monitors, memory access and instruction execution to intercept calls to graphics library 122 or direct calls to target GPU 110 in target code 124. In certain embodiments, host process 224 can be separated from VM 216 or, in alternative embodiments, incorporated within VM 216. Execution of target code 124 interacts with the hardware emulations for embedded system 100 within VM 216. However, host GPU 206 of host computer 200 is often different from target GPU 110 of embedded system 100. Further, target GPU 110 is generally too complex and too high-bandwidth to emulate within VM 216 and host process 224.

Target code 124 includes at least one graphics function call to a graphics function in graphics library 122, which is directed to target GPU 110 of embedded system 100 (shown in FIG. 1). However, given that target GPU 110 is not emulated within VM 216, graphics function calls are intercepted within VM 216 and redirected for execution by host GPU 206 of host computer 200. More specifically, target code 124 is parsed, either statically before execution, or before run-time, or dynamically during execution, or at run-time, to identify graphics function calls and to identify corresponding addresses in emulated memory for VM 216 allocated for the graphics functions (in graphics library 122), which may be found in emulated memory 222, or may be a section of emulated RAM, or may be in a target code stack. A plurality of graphics intercept functions 226 is defined in emulated memory 222 that include calls to corresponding graphics functions in graphics library 218 and targeted to host GPU 206. The corresponding addresses in emulated memory for VM 216 are mapped to the plurality of graphics intercept functions 226. The mapping may be stored, for example, in emulated memory 222 of VM 216. The mapping may be in the form of a table mapping the corresponding addresses to the plurality of graphics intercept functions. The mapping tables can be implemented within host process 224 and stored in either host memory 208 or in RAM 204. Alternatively, mapping tables can be implemented within VM 216 and stored in emulated memory 222. Accordingly, graphics function calls within target code 124 are intercepted before execution, at start-up of target code 124, or dynamically during execution, or at run-time, by graphics intercept functions and redirected to a corresponding graphics function in graphics library 218 in host memory 208 of host computer 200. Because the functions within graphics library 218 are directed to host GPU 206, the redirected graphics function call is executed by host GPU 206 to determine at least one feature configured to be rendered on display 210.

Figure 4:
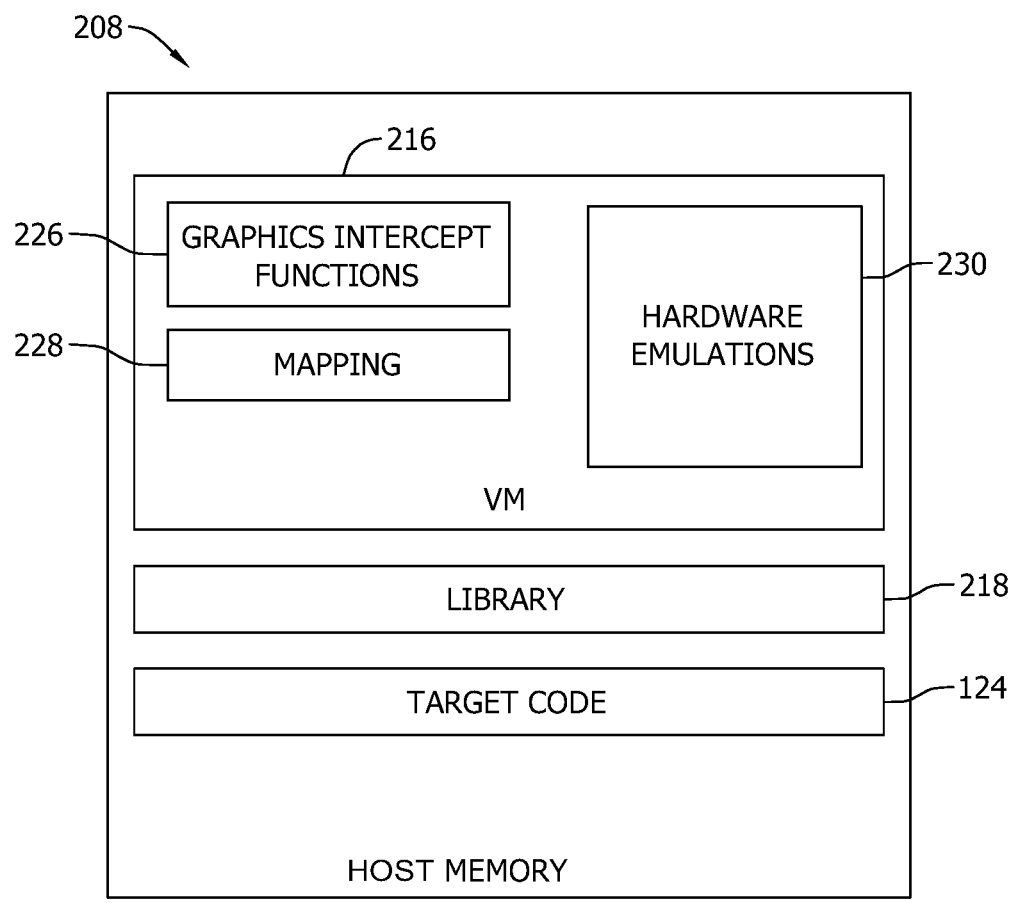
FIG. 4 is a block diagram of an example computer-readable memory for the host computer shown in FIG. 2 in accordance with an embodiment.

FIG. 4 is a block diagram of computer-readable host memory 208 for host computer 200 shown in FIG. 2. Host memory 208 is non-volatile memory, such as disk memory, coupled to host CPU 202, host GPU 206, and RAM 204 of host computer 200. Host memory 208 includes a section storing target code 124, a section storing graphics library 218 targeted to host GPU 206, and a section storing VM 216. VM 216, upon execution by host CPU 202, allocates a plurality of address spaces, for example, in RAM 204 corresponding to graphics functions invoked, or called, by target code 124. VM 216 includes, for example, in emulated memory 222 graphics intercept functions 226 and a mapping 228 of the plurality of address spaces to graphics intercept functions 226. VM 216 also includes hardware emulations 230 for virtualizing hardware components of embedded system 100. Accordingly, upon execution of target code 124, invocations of graphics functions are intercepted at their instruction code and redirected by a graphics intercept function 226 to a graphics function in graphics library 218, which is targeted to host GPU 206. Execution of the graphics function by host GPU 206 results in determining at least one feature configured to be rendered on display 210.

As described above, graphics intercept functions 226 include one or more calls to corresponding graphics functions in graphics library 218 in host memory 208 and targeted to host GPU 206. For example, graphics library 218 may include an OpenGL library, a DirectX library, or a Metal library.

Figure 5:
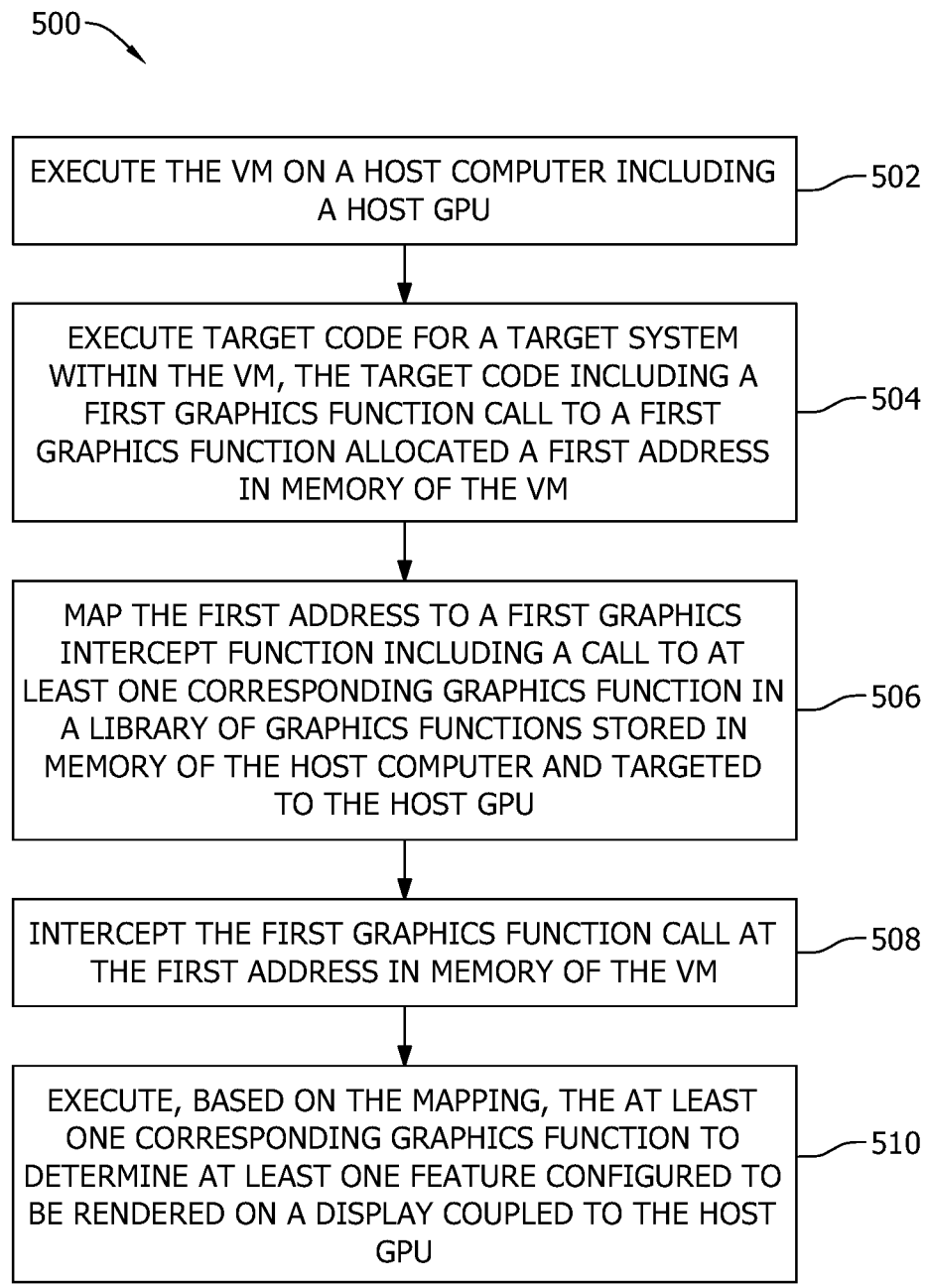
FIG. 5 is a flow diagram of an example method of executing graphics function calls in target code executing in a virtual machine emulating the embedded system shown in FIG. 1 in accordance with an embodiment.

FIG. 5 is a flow diagram of an example method 500 of executing graphics function calls in target code executing in a virtual machine, such as target code 124 executing on VM 216 emulating a target system 99, such as embedded system 100 shown in FIG. 1. VM 216 executes 502 on host computer 200, which includes host CPU 202, RAM 204, host GPU 206, and host memory 208. The VM 216 and, more specifically, host CPU 202 gains access to and executes 504 target code 124 for embedded system 100. Execution of target code 124 using VM 216 includes emulating certain hardware components of embedded system 100. Generally, for the purpose of method 500, target GPU 110 is not emulated.

Target code includes a first graphics function call to a first graphics function in graphics library 122 targeted to target GPU 110 of embedded system 100. The first graphics function call generally includes instructions for both target CPU 116 and target GPU 110 during execution. The first graphics function is allocated a first address in emulated memory of VM 216. Target code 124 is parsed for a plurality of graphics function calls, including the first graphics function call, to a plurality of corresponding graphics functions in graphics library 122 targeted to target GPU 110. Host computer 200 also identifies corresponding addresses in emulated memory of VM 216 allocated for the corresponding graphics functions. The first address is mapped 506 to a first graphics intercept function 226 defined in emulated memory 222 of VM 216. A plurality of graphics intercept functions 226 are defined in emulated memory 222, where the graphics intercept functions 226 each include at least one graphics function call to a corresponding graphics function in graphics library 218 in host memory 208 of host computer 200 and targeted to host GPU 206. For example, the first graphics intercept function includes a call to at least one corresponding graphics function in graphics library 218 stored in host memory 208 of host computer 200 and targeted to host GPU 206. Additionally, graphics intercept functions 226 also include instructions for the emulation of target CPU 116 in VM 216, such as a return opcode for the target code 124.

Upon execution of target code 124 by VM 216, the first graphics function call is intercepted 508, statically before execution, at start-up of target code 124, or dynamically during execution, or at run-time, at the first address in emulated memory of the VM, and redirected according to mapping 228 to the first graphics intercept function 226. Accordingly, host GPU 206 executes 510 the corresponding graphics function from graphics library 218 as instructed by the first graphics intercept function, resulting in determining at least one feature configured to be rendered on display 210.

In certain embodiments, target code may include direct calls to target GPU 110 independent of calls to graphics library 122. In such embodiments, direct calls to target GPU 110 are also intercepted and redirected to host GPU 206.

In some embodiments, mapping 506 corresponding addresses found in emulated memory of VM 216 to graphics intercept functions 226 includes a table mapping the corresponding addresses found in emulated memory of VM 216 allocated for the plurality of corresponding graphics functions to the plurality of graphics intercept functions 226.

An example technical effect of the methods, systems, and apparatus described herein includes at least one of: (a) emulating a target system using a VM, including graphics function calls without emulating the target GPU or re-hosting target code; (b) improving fidelity of virtualized display functionality of embedded systems; (c) intercepting graphics function calls in target code within the VM statically before execution, at start-up of target code, or dynamically during execution; and (d) redirecting graphics function calls to host graphics library and host GPU on host computer.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in some embodiments, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A host computer for emulating a target system, the host computer comprising:
   a host memory storing a library of graphics functions and a virtual machine (VM), the VM including a section of emulated memory storing target code configured to execute on the target system;
   a central processing unit (CPU) configured to execute the VM to emulate the target system, the VM configured to:
      execute the target code,
      intercept a graphics function call in the target code, and redirect the graphics function call to a corresponding graphics function in the library of graphics functions stored in the host memory; and
   a host graphics processing unit (GPU) configured to execute the corresponding graphics function to determine at least one feature configured to be rendered on a display coupled to the host GPU.

2. The host computer of claim 1, wherein the target code comprises binary code including a plurality of graphics function calls targeted to a target GPU of the target system.

3. The host computer of claim 2, wherein the VM includes a second section of emulated memory storing a mapping of addresses corresponding to the plurality of graphics function calls in the target code to a plurality of graphics intercept functions that include calls to at least one corresponding graphics function in the library of graphics functions stored in the host memory and targeted to the host GPU.

4. The host computer of claim 2, wherein the host memory stores a map of addresses corresponding to the plurality of graphics function calls in the target code to a plurality of graphics intercept functions that include calls to at least one corresponding graphics function in the library of graphics functions stored in the host memory and targeted to the host GPU.

5. The host computer of claim 1, wherein the host memory stores a library of OpenGL functions targeted to the host GPU.

6. The host computer of claim 1, further comprising a graphics interface coupled to the host GPU and configured to couple the host GPU to the display.

7. The host computer of claim 6, further comprising an avionics display device coupled to the graphics interface.

8. A method of executing graphics function calls in a virtual machine (VM) emulating a target system, the method comprising:
   executing the VM on a host computer including a host graphics processing unit (GPU);
   executing target code for the target system within the VM, the target code including a first graphics function call to a first graphics function allocated a first address in emulated memory of the VM;
   mapping the first address to a first graphics intercept function including a call to at least one corresponding graphics function in a library of graphics functions stored in host memory of the host computer and targeted to the host GPU;
   intercepting the first graphics function call at the first address in emulated memory of the VM; and
   executing, based on the mapping, the at least one corresponding graphics function to determine at least one feature configured to be rendered on a display coupled to the host GPU.

9. The method of claim 8, further comprising parsing the target code for a plurality of graphics function calls to a plurality of corresponding graphics functions, including the first graphics function call to the first graphics function, and identifying corresponding addresses in emulated memory of the VM allocated for the plurality of corresponding graphics functions.

10. The method of claim 9, further comprising defining a plurality of graphics intercept functions corresponding to the plurality of corresponding graphics functions, and mapping the corresponding addresses in emulated memory of the VM to the plurality of graphics intercept functions.

11. The method of claim 10, further comprising storing, in emulated memory of the VM, a table mapping the corresponding addresses in emulated memory of the VM allocated for the plurality of corresponding graphics functions to the plurality of graphics intercept functions.

12. The method of claim 8, wherein executing the VM on the host computer comprises emulating hardware components of the target system, the hardware components excluding a target GPU of the target system.

13. A computer-readable memory coupled to a central processing unit (CPU), a host graphics processing unit (GPU), and random access memory (RAM) of a host computer, the computer-readable memory comprising:
   a target code section storing target code configured to be executed by a target system;
   a library of graphics functions targeted to the host GPU;
   a virtual machine (VM) section storing a VM that, upon execution by the CPU, allocates a plurality of address spaces in the RAM corresponding to graphics functions invoked by the target code, the VM section including:
      a plurality of graphics intercept functions including calls to at least one corresponding graphics function in the library of graphics functions targeted to the host GPU; and
      a mapping of the graphics functions invoked by the target code to the plurality of graphics intercept functions, wherein execution of the target code by the VM results in intercepting invocations of graphics functions in the target code and redirecting the invocations to at least one corresponding graphics function targeted to the host GPU to determine at least one feature configured to be rendered on a display coupled to the host GPU.

14. The computer-readable memory of claim 13, wherein the VM section stores emulations of hardware components of the target system.

15. The computer-readable memory of claim 13, wherein intercepting invocations of graphics functions in the target code occurs statically before execution of the target code.

16. The computer-readable memory of claim 13, wherein intercepting invocations of graphics functions in the target code occurs at start-up of the target code.

17. The computer-readable memory of claim 13, wherein intercepting invocations of graphics functions in the target code occurs dynamically during execution of the target code.

18. The computer-readable memory of claim 13, wherein the library of graphics functions includes an OpenGL library.

19. The computer-readable memory of claim 13, wherein the library of graphics functions includes a DirectX library.

20. The computer-readable memory of claim 13, wherein the library of graphics functions includes a Metal library.

21. A virtual machine (VM) for emulating a target system, the VM comprising:

emulated memory storing target code configured to executed on the target system; and an emulated central processing unit (CPU) configured to:
  execute the target code,
  intercept a graphics function call in the target code, and
  redirect the graphics function call to a corresponding graphics function in a library of graphics functions directed to a host graphics processing unit (GPU).

22. The VM of claim 21, wherein the target code comprises binary code including a plurality of graphics function calls targeted to a target GPU of an avionics device.

23. The VM of claim 21, wherein the VM includes a second section of emulated memory storing a mapping of addresses corresponding to a plurality of graphics function calls in the target code to a plurality of graphics intercept functions that include calls to at least one corresponding graphics function in the library of graphics functions targeted to the host GPU.

24. The VM of claim 21, wherein the emulated CPU is further configured to intercept the graphics function call in the target code before execution of the target code.

25. The VM of claim 21, wherein the emulated CPU is further configured to intercept the graphics function call in the target code at start-up of the target code.

26. The VM of claim 21, wherein the emulated CPU is further configured to intercept the graphics function call in the target code during execution of the target code.

* * * * *